United States Patent [19]
Smullin et al.

[11] Patent Number: 6,024,617
[45] Date of Patent: Feb. 15, 2000

[54] MARINE ENGINE SILENCING APPARATUS AND METHOD

[75] Inventors: Joseph I. Smullin, Swampscott; Matthew E. Denis, Marblehead, both of Mass.

[73] Assignee: Smullin Corporation, Marblehead, Mass.

[21] Appl. No.: 08/907,197

[22] Filed: Aug. 6, 1997

[51] Int. Cl.[7] .................................................. B63H 21/32
[52] U.S. Cl. ............................................. 440/89; 181/260
[58] Field of Search ...................... 55/DIG. 30; 181/235, 181/260; 60/310, 311; 96/236, 239, 256, 262, 301, 305, 306; 440/89

[56] References Cited

U.S. PATENT DOCUMENTS

| | | | |
|---|---|---|---|
| 1,938,849 | 12/1933 | Maxim et al. | 183/21 |
| 4,019,456 | 4/1977 | Harbert . | |
| 4,917,640 | 4/1990 | Miles, Jr. . | |
| 5,022,877 | 6/1991 | Harbert . | |
| 5,550,337 | 8/1996 | Tazaki et al. | 181/235 |
| 5,588,888 | 12/1996 | Magharious . | |
| 5,746,630 | 5/1998 | Ford et al. | 440/89 |

OTHER PUBLICATIONS

Perry et al., "Phase Separation," Chemical Engineers' Handbook, Fourth Edition, Copyright© 1963 by McGraw–Hill, Inc., pp. 18–82 to 18–86.
Centek Industries, Inc., Product Information Catalog (1997).
Boating Industry Magazine, Jul. 1997 at 61.

Soundown Waterdrop$_{tm}$ Silencer Product Information.

*Primary Examiner*—Ed Swinehart
*Attorney, Agent, or Firm*—Wolf, Greenfield & Sacks, P.C.

[57] ABSTRACT

An apparatus and method for silencing marine engines. In one embodiment, a separation chamber receives a fluid mixture of exhaust gas and liquid coolant and a dynamic separation member separates the exhaust gas from the liquid coolant. In one aspect of the invention, a horizontal axial-flow silencer includes a separation plate, having at least one dynamic separator, horizontally positioned in the separation chamber. A dam maintains the free surface of the fluid mixture at or slightly above the separation plate at an engine speed within nominal operating range, and provides for the continuing passage of exhaust gas through the liquid coolant. The separation plate employs inertial effects introduced by a series of vanes that deflect the gas-coolant mixture upstream to separate the coolant with a greater inertia from the exhaust gas with a lesser inertia. Alternatively, the separation plate may consist of a mesh pad that employs frictional effects to achieve a similar result. The separated exhaust gas is passed through a resonator tube or tubes to further attenuate the acoustic energy of the gas. The resonator tubes may be oriented to impart angular momentum to further dry and purify the gas by the centrifigal separation of remaining liquid coolant or particulate matter from the exhaust gas. The separated exhaust gas and liquid coolant may be separately expelled from the silencer, or they may be recombined in an expulsion chamber of the silencer to be exhausted through a single tube.

65 Claims, 14 Drawing Sheets

MARINE ENGINE SILENCING APPARATUS AND METHOD

FIELD OF THE INVENTION

The present invention generally relates to devices and methods for silencing marine engines and, more particularly, to such devices and methods employing water cooling of the exhaust gas and a subsequent separation of the water from the gas.

BACKGROUND OF THE INVENTION

The present invention belongs to the general class of internal combustion engine exhaust silencers or mufflers that may be characterized as attempting to achieve a "cold, wet/dry" condition, as contrasted with "cold, wet" or "hot, dry" conditions, for extracting acoustic energy from exhaust gas. A "cold, wet/dry" condition is one in which a liquid coolant, typically water, first has been added to the exhaust gas of an engine, typically a marine engine, in order to reduce the temperature of the exhaust gas (the "cold, wet" stage), and then the water has been separated from the gas (the "dry" stage) in preparation for further reduction of the acoustic energy of the "dry" gas. The reduction in temperature is desirable for two reasons. First, the lower temperature reduces the acoustic velocity in the gas, that is, the speed at which sound propagates through the gas. The lower the acoustic velocity, the smaller the chamber that may be used to achieve a given reduction in acoustic energy, or noise. Alternatively, greater noise reduction can be achieved in a given space. Second, as the exhaust gas cools, it becomes denser. Thus, the dynamic pressure of the gas passing through a tube of a given size is reduced, resulting in a reduction in the pressure drop through the tube, and, consequently, a smaller "back pressure" effect. Back pressure is undesirable because it may interfere with the efficient operation of the engine or may damage it.

One undesirable attribute of cold, wet marine-exhaust silencers is that the reduction in back pressure achieved by water cooling, as just described, is offset as a consequence of the presence of water mixed with the gas. The denser net mass of the inhomogeneous water-gas mixture, as compared to a cold, wet/dry system in which the water has been removed, or as compared to a hot, dry system in which water was never added, results in an increase in back pressure. In order to avoid excessive back pressure, water-gas velocities in cold, wet exhaust systems must be held to a range of 20 to 50 feet per second (fps). This velocity restriction places requirements on the sizes of pipes, which in some cases makes the silencers larger or less effective than desirable. Moreover, whereas in a "dry" gas silencer, i.e., either a "hot, dry" or "cold, wet/dry" silencer, the "dry gas" may be conducted to a remote discharge point using a routing of both upward and downward pitched piping, such routing is often impracticable in a "wet" silencer because of an unacceptably large increase in back pressure for upward pitches and for corners. Because the appropriate discharge of exhaust gas from the vessel may be an important safety and convenience consideration, the limitation on discharge-pipe routing imposed by mixed water and gas discharge can impose a serious design problem or constraint.

In general, prior art marine-exhaust silencers have not optimally balanced the benefits of water cooling with the need to reduce back pressure while minimizing the size of the silencer. More specifically, some prior art marine-exhaust silencers attempt to operate in a "cold, wet/dry" condition but fail to achieve sufficient separation of the water from the gas. Other designs improve on such separation at the expense of larger size and reduced flexibility of configuration.

For example, U.S. Pat. No. 5,022,877 to Harbert and U.S. Pat. No. 4,019,456 to Harbert rely on gravitational effects and condensation to separate the exhaust gas from the water coolant, thus only partially achieving a "cold, wet/dry" condition. Greater separation using these means could be achieved, but at the expense of increasing the size of the silencer; ie., by providing a larger free surface of the gas-water mixture through which the gas could rise, or at the expense of increased back pressure due to elaborate flow control. U.S. Pat. No. 4,917,640 to Miles employs such an approach by providing a more complex configuration of tubular separation chambers. Another approach, disclosed in U.S. Pat. No. 5,588,888 to Maghurious, is to agitate the wet mixture of exhaust gas and water in order to atomize the water droplets in the mixture and thereby increase the absorption of acoustic energy by the water mass. This approach thus is a variation of a cold, wet design in that it relies upon reduction in the acoustic energy of the exhaust gas before it is fully separated from the water, thereby incurring the penalties associated with cold, wet systems already noted.

Accordingly, an apparatus and method are needed that overcome the drawbacks of prior art marine-engine silencing devices and methods, in particular by achieving better separation of the exhaust gas from the liquid coolant prior to further reduction of the acoustic energy of the exhaust gas.

SUMMARY OF THE INVENTION

In one aspect of the invention, these needs are met by a silencer wherein a fluid mixture consisting of exhaust gas and liquid coolant enters a separation chamber of the invention having an in-flow port for receiving the fluid mixture, an out-flow port for the separated exhaust gas (dry gas), and a liquid-coolant out-flow port. The separation chamber contains a separation plate having at least one dynamic separator for separating the exhaust gas from the liquid coolant by inertial or frictional effects, or both. In a further aspect of the invention, the separation plate may be horizontally positioned in the separation chamber below the out-flow port for the dry gas and above the out-flow port for the separated liquid coolant. A dam chamber may be connected to the separation chamber via the liquid coolant out-flow port in order to retain the fluid mixture in the separation chamber so that the acoustic velocity of the exhaust gas may be reduced by cooling, and generally to maintain the free surface level of the fluid mixture at or slightly above the separation plate when the engine is operating at speeds that are in the generally lower range of operating speeds. At engine speeds that are in the generally higher range of operating speeds, the dam allows the free surface level of the fluid to drop in response to the increase of pressure in the separation chamber, thereby minimizing further increase of back-pressure associated with the increased gas flow.

The separation plate achieves inertial separation effects by directing the liquid coolant component of the fluid mixture, having a higher momentum than the gas component, in an upstream direction by vaned slots in the separation plate. Alternatively, or in addition, frictional effects may be employed by using a separation plate consisting at least in part of a mesh pad or other porous, but flow-impeding, medium for slowing the liquid coolant component and allowing the dry gas to rise into the region of the separation chamber above the separation plate.

In one variant, the dry gas and the liquid coolant are recombined in an expulsion chamber that provides for further retention of the recombined fluid mixture and thus further cooling of the exhaust gas. The expulsion chamber may also include an outlet tube for taking up the recombined fluid mixture and expelling it from the expulsion chamber. The outlet tube may, in some embodiments, include a relief hole for regulating back pressure and noise. In another variant, the expulsion chamber provides separate out-flow ports for the dry gas and liquid coolant so that they are not recombined.

In a further elaboration of either variant, a resonator chamber, which may have perforations, may be added so that the dry gas flows from the upper portion of the separation chamber into the resonator chamber for reduction of the acoustic energy of the dry gas. The dry gas exits the resonator chamber into the expulsion chamber and then, in accordance with the foregoing, may be recombined with the liquid coolant for expulsion through a single tube or expelled through a separate expulsion tube. In yet a further variation, one or more resonator chambers may be disposed at an angle to the flow of dry gas to impart to it an angular momentum. The resulting spinning of the dry gas within the expulsion chamber, optionally supported by baffles for directing such flow or by curvature of the inner surface of the expulsion chamber itself, may allow centrifugal separation of liquid coolant remaining in the dry gas or removal of particulate matter.

One method for silencing of marine engines in accordance with the invention comprises the steps of receiving the fluid mixture of exhaust gas and liquid coolant in a separation chamber and imposing therein a separator having inertial or frictional separation effects. In a further aspect, the method may comprise the further step of regulating the free surface level of the fluid mixture in the separation chamber. Optionally, such method may also comprise the steps of passing the dry gas through one or more resonator chambers. Also, the steps of expelling the dry gas and liquid coolant from an expulsion chamber either separately through two expulsion tubes, or together through a single expulsion tube, may be included. In another aspect, the method may include orientation of one or more resonator chambers to impart to the dry gas an angular momentum.

BRIEF DESCRIPTION OF THE DRAWINGS

The objects, features and advantages of this invention will be more clearly appreciated from the following detailed description when taken in conjunction with the accompanying drawings, in which.

DETAILED DESCRIPTION

Figure 1:
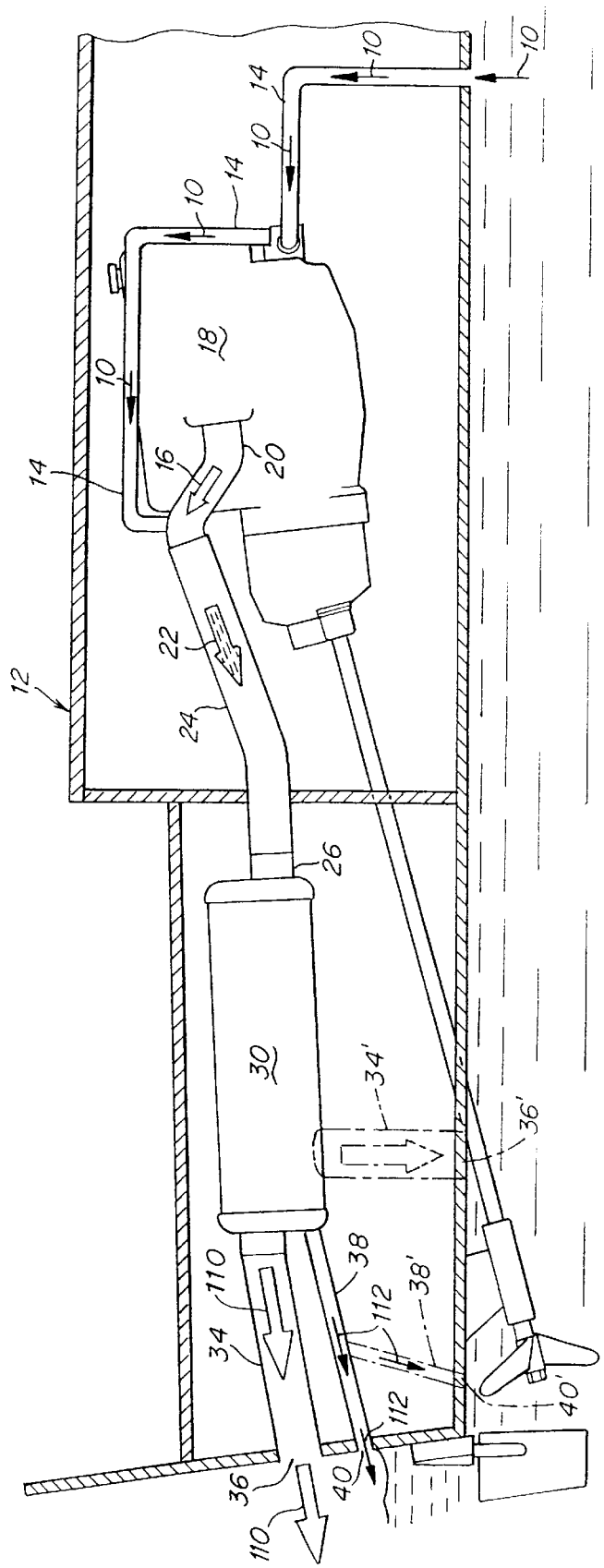
FIG. 1 is a schematic representation of one embodiment of the invention disposed within a marine vessel for wet-dry-dry applications.

The detailed description below should be read in conjunction with the accompanying figures in which like reference numerals indicate like structures and method steps. The examples included in the description are intended merely to be illustrative. The apparatus and method described are intended to be applicable to marine engine silencing systems such as might be used for quieting the engines of marine vessels or for quieting marine generators. The need for more effective marine engine silencers is broadly based. Pleasure and commercial craft operating on rivers, lakes, and near sea shores are a possible source of noise irritation to neighbors and other boaters; boat owners and users often desire the quietest possible environment for enjoying their avocation or pursuing their work; and marine generators may run for extended periods of time in proximity to workers or residents.

As already noted, the "cold, wet/dry" approach to marine engine noise attenuation offers superior results in terms of quieting, reducing the negative effects of back pressure on engine operation, and allowing compact and flexible silencer designs. The present invention employs a novel means of separating liquid coolant, typically water, from the exhaust gas to further realize these desired results beyond the achievements of the prior art. In one illustrative embodiment of the invention, the "dry gas" resulting from the separation process may be accelerated to velocities as high as approximately 80 to 100 feet per second without creating excessive back pressure. Such high velocities allow the silencer to be significantly smaller than fully wet systems of similar silencing effectiveness. It will be understood that the term "dry gas" is used in this context throughout to refer to the separation product that is predominantly, but not purely, exhaust gas. Complete separation generally is not practicable and it is to be anticipated that some liquid coolant will remain in the dry gas flow through discharge. Thus, the term "dry gas" should be understood to mean "consisting predominantly of exhaust gas," and references to "liquid coolant" as the product of the separation process should be understood to mean "consisting predominantly of liquid coolant," as some exhaust gas typically will remain.

The invention will now be described in greater detail in reference to the exemplary implementations of horizontal, axial-flow silencers that are described in reference to FIGS. 1–13 in alternative configurations. In one configuration, the dry gas and the liquid coolant are discharged separately from the silencer in what may be referred to as a "wet-dry-dry" configuration, indicating that the exhaust gas is first wetted by mixing it with the liquid coolant, then dried by the separation means discussed below, and then expelled from the silencer in a "dry" condition. This configuration is represented in FIG. 1, in which liquid coolant 10, typically obtained from the water in which vessel 12 is situated, is moved through a tube 14 for mixing with exhaust gas 16 exhausted by engine 18 through the exhaust manifold 20. In FIG. 1, the source of liquid coolant 10 is shown as engine raw water coolant; i.e., water in which vessel 12 is situated that is used for cooling the engine, either directly or through a heat exchanger. It will be understood that liquid coolant 10 may also be obtained directly from the water in which the vessel is situated; i.e., without such water being used in the cooling of the engine. In any case, the resulting fluid mixture of cooled exhaust gas and liquid coolant (hereafter simply "fluid mixture") 22 moves through tube 24 to inlet 26 of horizontal, axial-flow silencer 30. The fluid mixture 22 is separated into dry gas and liquid coolant, and acoustic energy is removed from the dry gas and liquid coolant in the silencer, as described below. Dry gas 110 is then discharged from silencer 30 through exhaust tube 34, out exhaust port 36, and to the environment outside of vessel 12. Liquid coolant 112 is separately discharged through coolant discharge tube 38, out coolant outlet port 40, to the external environment. Either discharge tube 38, or exhaust tube 34, or both, may be located so that liquid coolant 112 or dry gas 110, respectively, is discharged below the water line instead of above the water line. Discharge tube 38' and exhaust tube 34' are shown in shadow to indicate one such configuration in which coolant outlet port 40' and exhaust port 36' are located below the water line.

Figure 2:
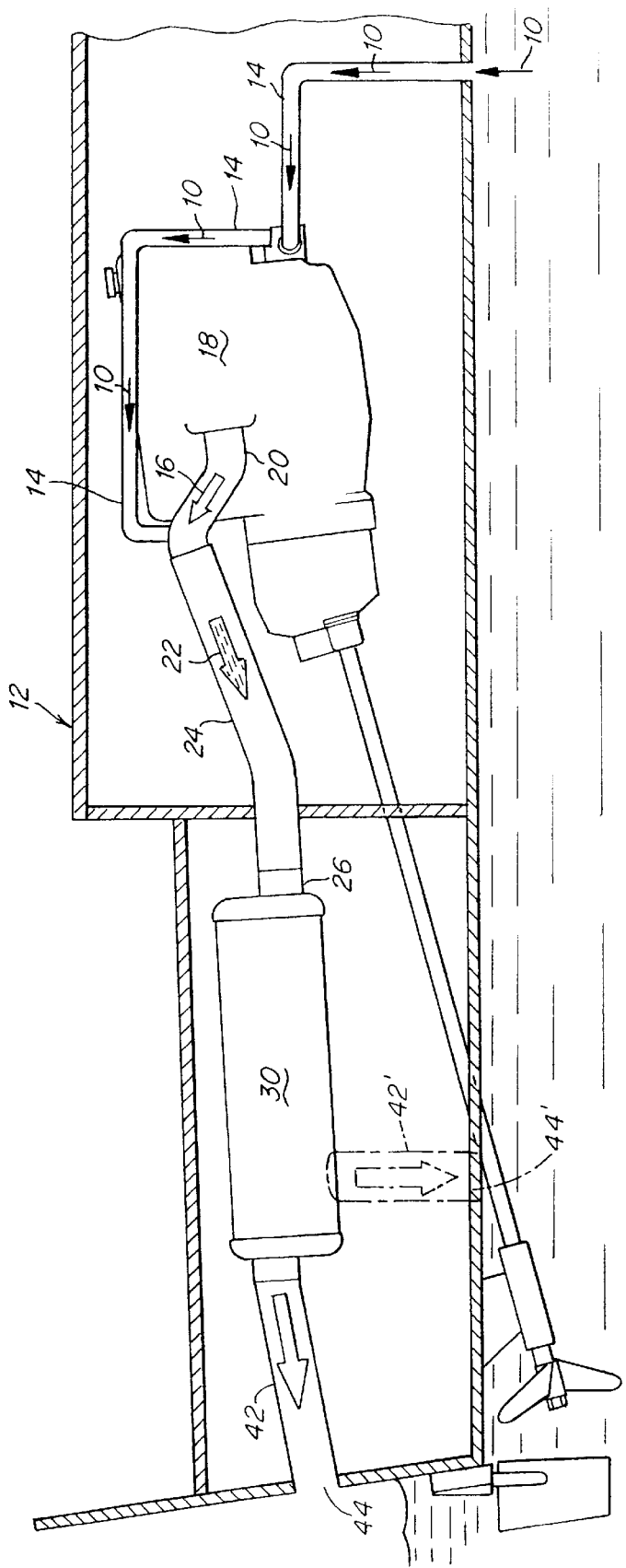
FIG. 2 is a schematic representation of one embodiment of the invention disposed within a marine vessel for wet-dry-wet applications.

In some cases, however, such as in retrofitting an existing vessel as contrasted with new boat construction, the configuration described above with respect to FIG. 1 may be undesirable because of the need to provide separate exhaust and coolant outlet ports 36 and 40, respectively, and the associated tubing. An alternative design is thus to recombine the dry gas and the liquid coolant after acoustic energy has been extracted from the dry gas and liquid coolant, and to expel the re-combined exhaust gas and liquid coolant through a single exhaust port. This arrangement, referred to as a "wet-dry-wet" configuration, is shown in FIG. 2, in which all elements are the same as just described with respect to FIG. 1, except that, in place of exhaust tubes 34 and 38, a single exhaust tube 42 is provided to expel the re-combined dry gas and liquid coolant through exhaust port 44. An alternative configuration is shown in shadow in which exhaust tube 42' is directed so that exhaust port 44' is situated below the water line.

Figure 3:
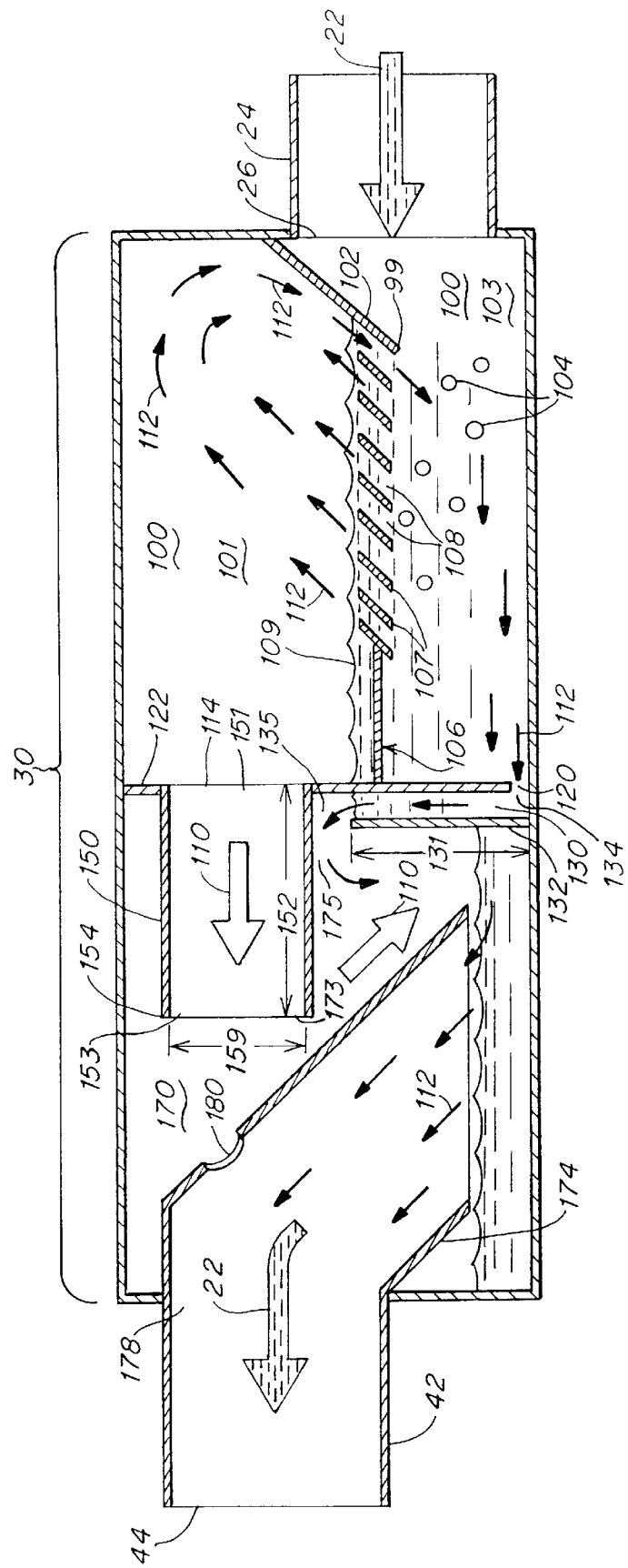
FIG. 3 is a cross-sectional side view of one embodiment of the invention for wet-dry-wet applications operating at relatively low engine speeds.
Figure 4:
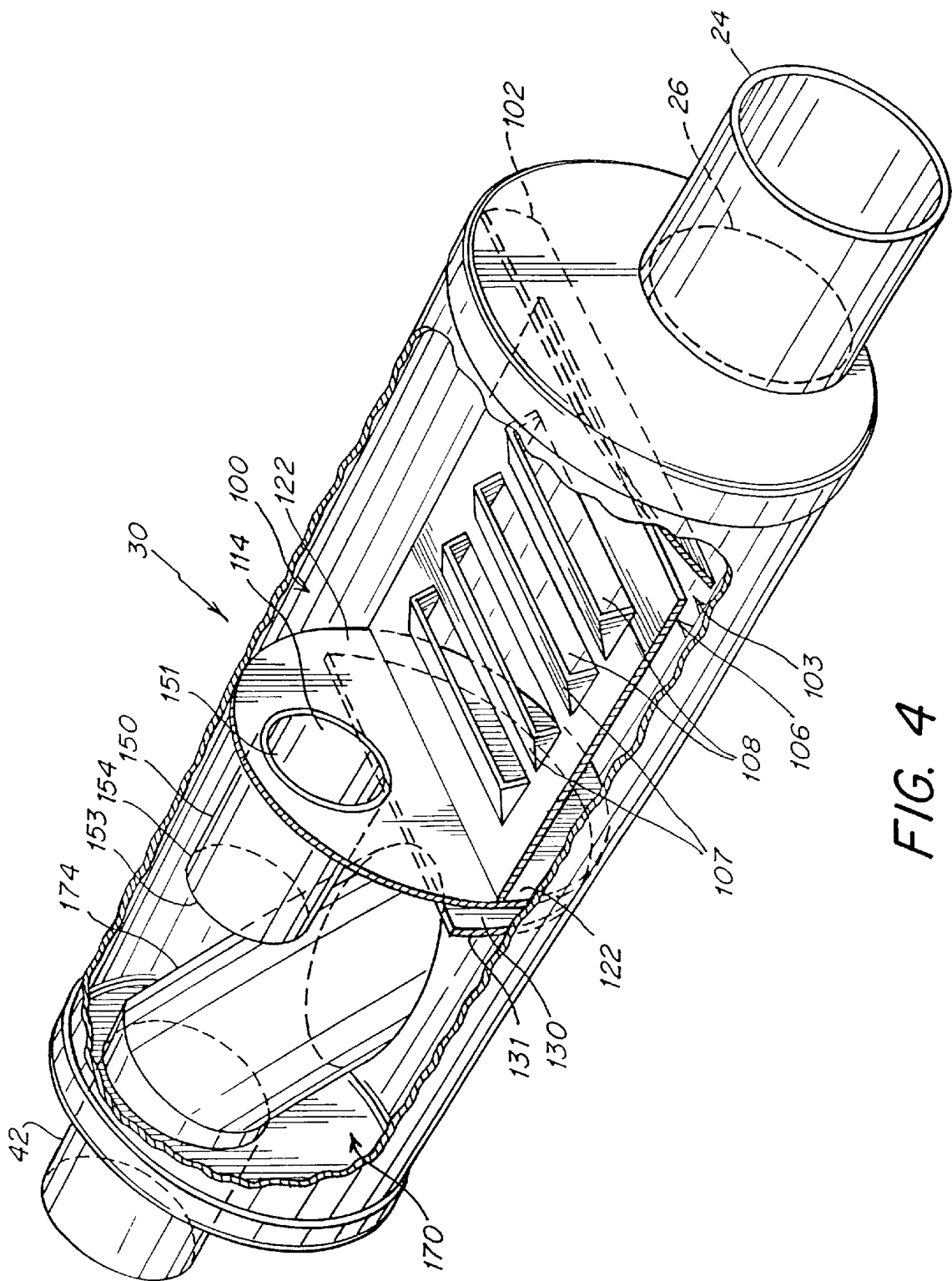
FIG. 4 is an isometric cutaway of the embodiment of FIG. 3.

The horizontal axial-flow silencer 30, in both the wet-dry-dry configuration of FIG. 1, and the wet-dry-wet configuration of FIG. 2, will now be described with reference to FIGS. 3–13. The configuration of the horizontal axial-flow silencer represented in FIG. 3 is the wet-dry-wet configuration operating at relatively low engine speeds. This wet-dry-wet configuration is also shown in an isometric, cutaway view in FIG. 4, although FIG. 4 is not specific as to the engine speed and thus is equally applicable to a wet-dry-wet configuration at relatively high engine speed, such as shown in FIG. 12. In FIGS. 3 and 4, fluid mixture 22 enters through inlet 26 to separation chamber 100. Fluid mixture 22 is deflected toward the lower portion 103 of separation chamber 100 under separation plate 106 by a baffle 102 oriented at an obtuse angle to the flow of fluid mixture 22. The invention thereby advantageously provides for pushing fluid mixture 22 into the highly wetted portion of separation chamber 100 below free surface 109 of fluid mixture 22. At relatively low engine speeds in which the velocity of fluid mixture 22 is relatively low, for example roughly in the range of 8 to 30 fps, bubbles 104 may form in the fluid mixture, as shown in FIG. 3. These bubbles cause greater reflection of acoustic energy back to the engine, thus improving the noise reduction. The reason for this reflection is that the acoustic energy contained in each gas bubble must traverse the surrounding water that, having a higher density than the gas, reflects a large fraction of the acoustic energy back toward the source, ie., the engine. The bubbles also increase opportunities for inertial-frictional separation when fluid mixture 22 comes in contact with separation plate 106, as described below. As noted below in relation to FIG. 13, such bubbles may not form at higher engine speeds. Rather, the mixture of exhaust gas and liquid coolant may form a slurry.

Figure 5:
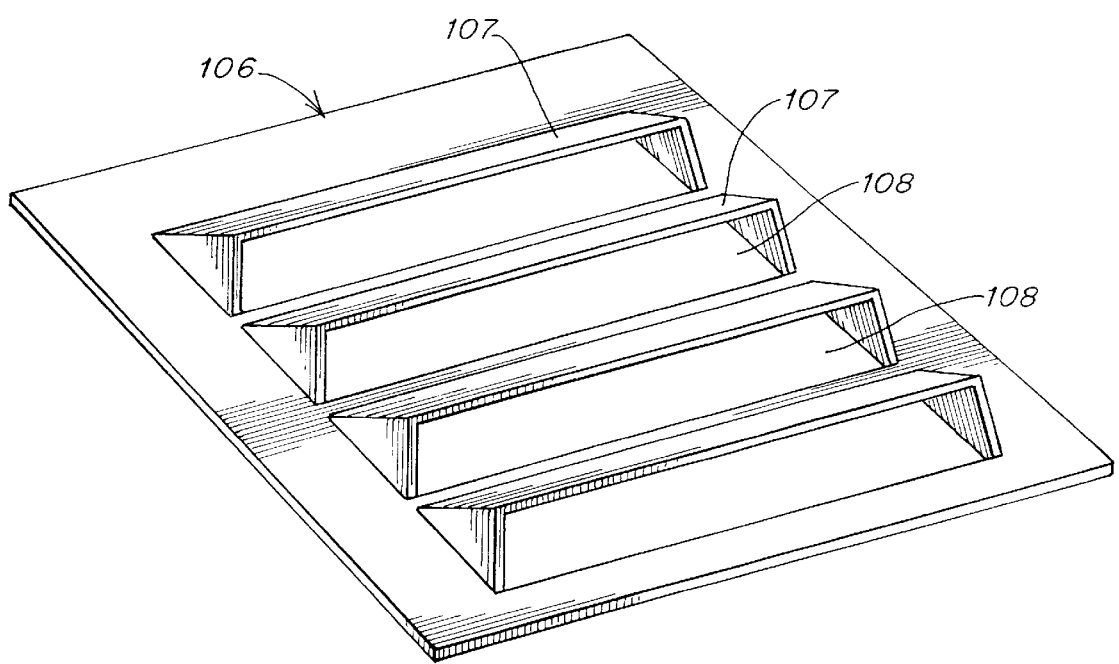
FIG. 5 is an isometric view of one embodiment of a dynamic separation plate with deflecting vanes.

In the configuration represented in FIGS. 3 and 4, separation plate 106 has a series of alternating apertures 108 and vanes 107, as shown in detail in FIG. 5. Vanes 107 are oriented in a direction generally counter to the flow of fluid mixture 22 through inlet 26, and the vanes extend above and below the plane of separation plate 106 at an acute angle to such flow. Vanes 107 thereby direct the flow of fluid mixture 22 upward, through apertures 108, and away from dry-gas out-flow port 114. Free surface 109 of fluid mixture 22 reaches a level, by operation of dam chamber 130 described below, that typically may be at or slightly above separation plate 106, although, as noted below in relation to FIG. 13, such level may vary according to engine speed and other factors.

Inertial separation is achieved when liquid coolant component 112, having a greater inertia than the lower density dry gas component 110, is engaged by vanes 107, deflected by the vanes upward through apertures 108 and away from dry-gas out-flow port 114, and then falls back due to gravity through apertures 108 and into lower portion 103 of separation chamber 100. Lower end 99 of baffle 102 may advantageously extend below the plane of separation plate 106 and be spaced therefrom to facilitate the re-introduction of liquid coolant component 112 into the lower portion 103 of separation chamber 100. In contrast to this recirculation of the liquid coolant component 112 as just described, dry gas component 110 similarly is deflected upward and away from the dry-gas out-flow port 114, but largely remains in upper portion 101 of separation chamber 100, i.e., the portion above separation plate 106, due to the low density of dry gas component 110. Also because of its low density and therefore lower inertia as compared to liquid coolant component 112, dry gas component 110 readily changes flow direction in upper portion 101 rather than falling through apertures 108 in separation plate 106, and is pushed out dry-gas out-flow port 114 in wall 122 at the downstream end of upper portion 101 of separation chamber 100 and into resonator tube 150. It will be understood that the number and shape of vanes 107, their alignment with respect to the flow of fluid mixture 22, their angle with respect to the surface of separation plate 106, the distance to which they extend above or below the separation plate, their shape or curvature above or below the separation plate, and their placement on the separation plate, may all be varied to optimize the described effect with respect to different geometries of separation chamber 100, the anticipated range and nominal operation of engine speed, and other factors. Similarly, it will be understood that the number, shape, and arrangement of apertures 108 may be varied.

Figure 6A:
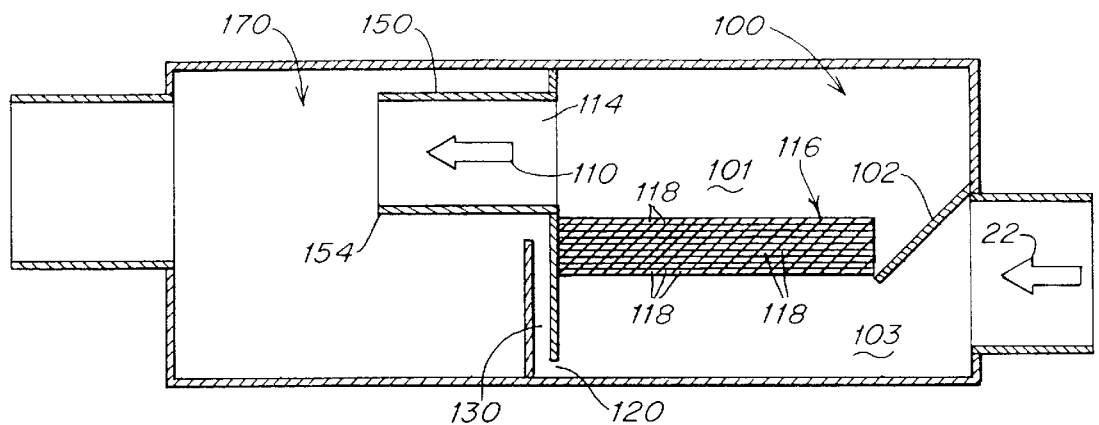
FIG. 6A is a cross sectional side view of one embodiment of a dynamic separation plate having a mesh pad.
Figure 6B:
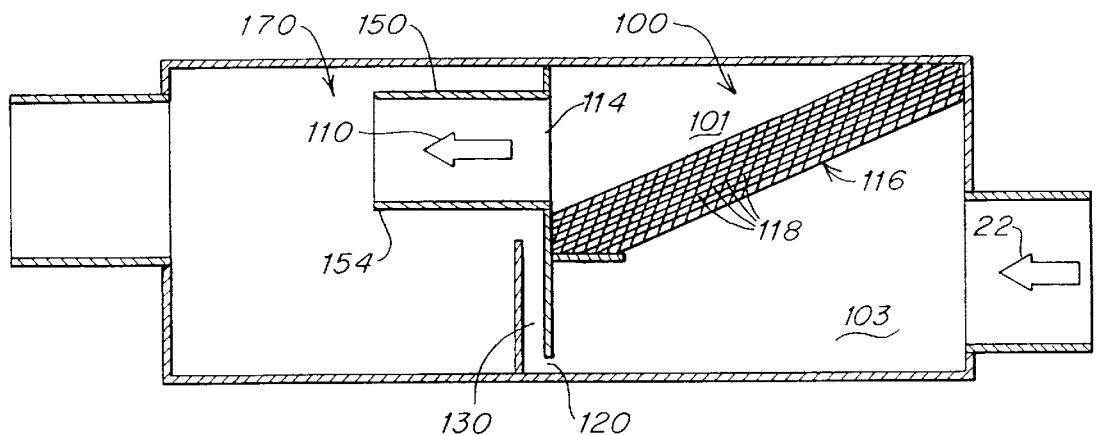
FIG. 6B is a cross sectional side view of one embodiment of a dynamic separation plate having an angled mesh pad.
Figure 6C:
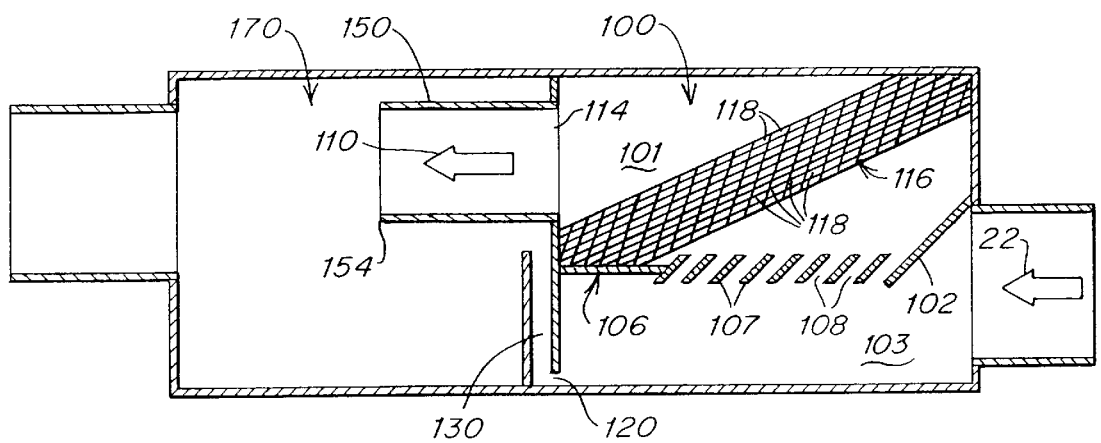
FIG. 6C is a cross sectional side view of one embodiment of a dynamic separation plate having vanes and a mesh pad.
Figure 7:
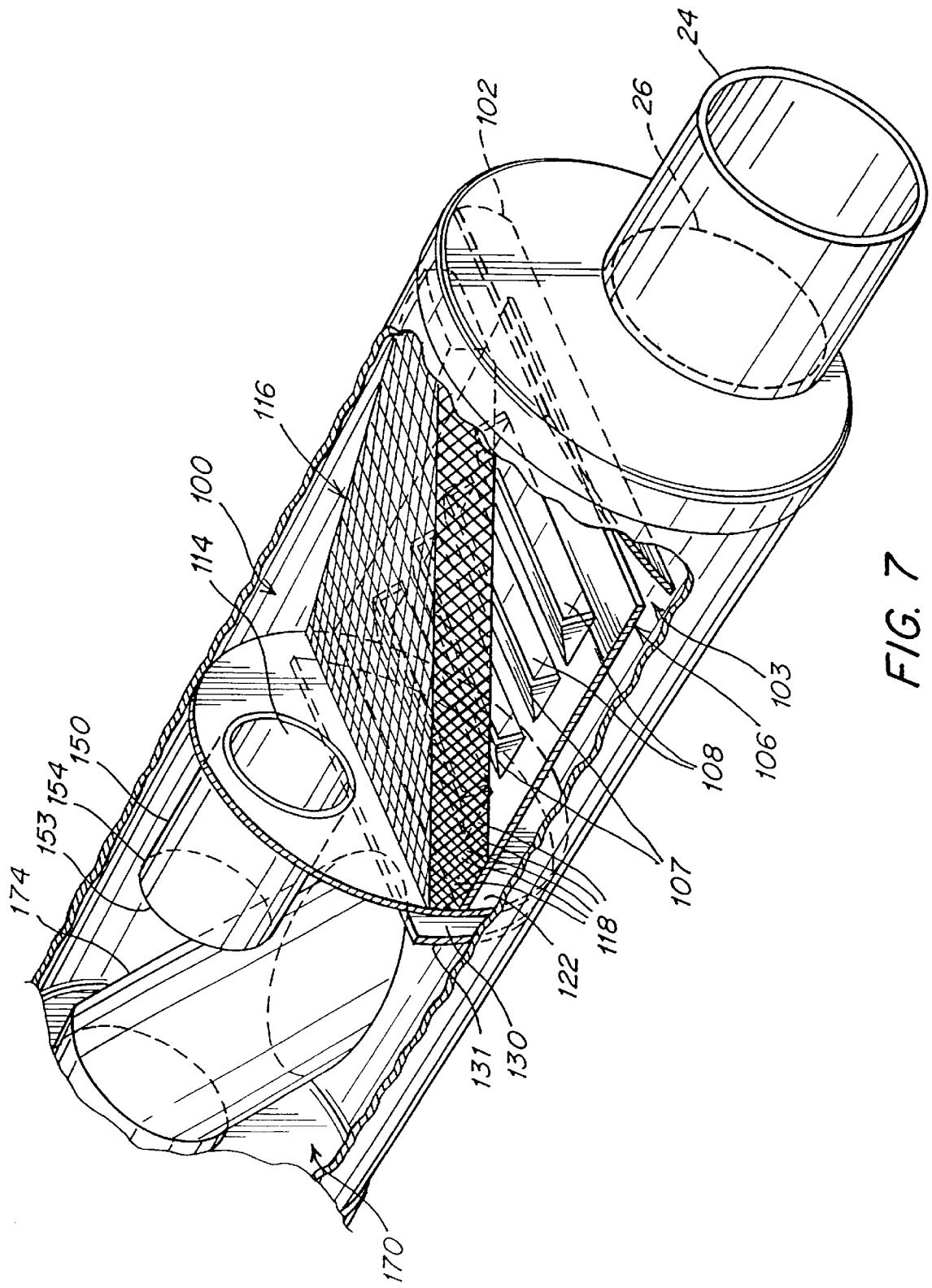
FIG. 7 is a partial cut-away, isometric view of the separation plate of FIG. 6C.

Alternatively, in another embodiment of separation plate 106 of the invention, apertures 108 and vanes 107 may be reduced or eliminated and a portion or all of separation plate 106 may consist of a mesh pad 116 or similar network of passageways or holes 118 through which fluid mixture 22 may pass. Mesh pad 116 may be a fibrous structure made of metal wire, plastic, or other suitable material, or may be made of other types of porous material such as a cast porous plastic. Some embodiments of separation plate 106 including a mesh pad 116 are shown in FIGS. 6A, 6B, 6C, and 7. FIG. 6A show separation plate 106 consisting entirely of mesh pad 116 disposed generally horizontally in separation chamber 100, with baffle 102 disposed to direct fluid mixture 22 toward lower portion 103 of the separation chamber, as described above. FIG. 6B again shows separation plate 106 consisting entirely of mesh pad 116, but now disposed at an acute angle to the flow of fluid mixture 22 into separation chamber 100. As indicated in FIG. 6B, baffle 102 may be eliminated in some configurations. FIG. 6C shows a combination of a separation plate employing vanes together with a mesh pad that is disposed above the separation plate at an acute angle as in FIG. 6B. FIG. 7 shows the configuration of FIG. 6C in an isometric view with partial cut-away of separation chamber 100, expulsion chamber 170, and mesh pad 116.

In the embodiments illustrated in FIGS. 6A, 6B, 6C, and 7, the frictional effects introduced by the contact of fluid mixture 22 with mesh pad 116 disproportionately retard the flow of the denser, more viscous, liquid coolant component 112 of fluid mixture 22 as compared with the flow of dry gas component 110. Dry gas component 110 thus rises through holes 118 into upper portion 101 of separation chamber 100 and thence through dry-gas out-flow port 114 into resonator tube 150.

Figure 14:
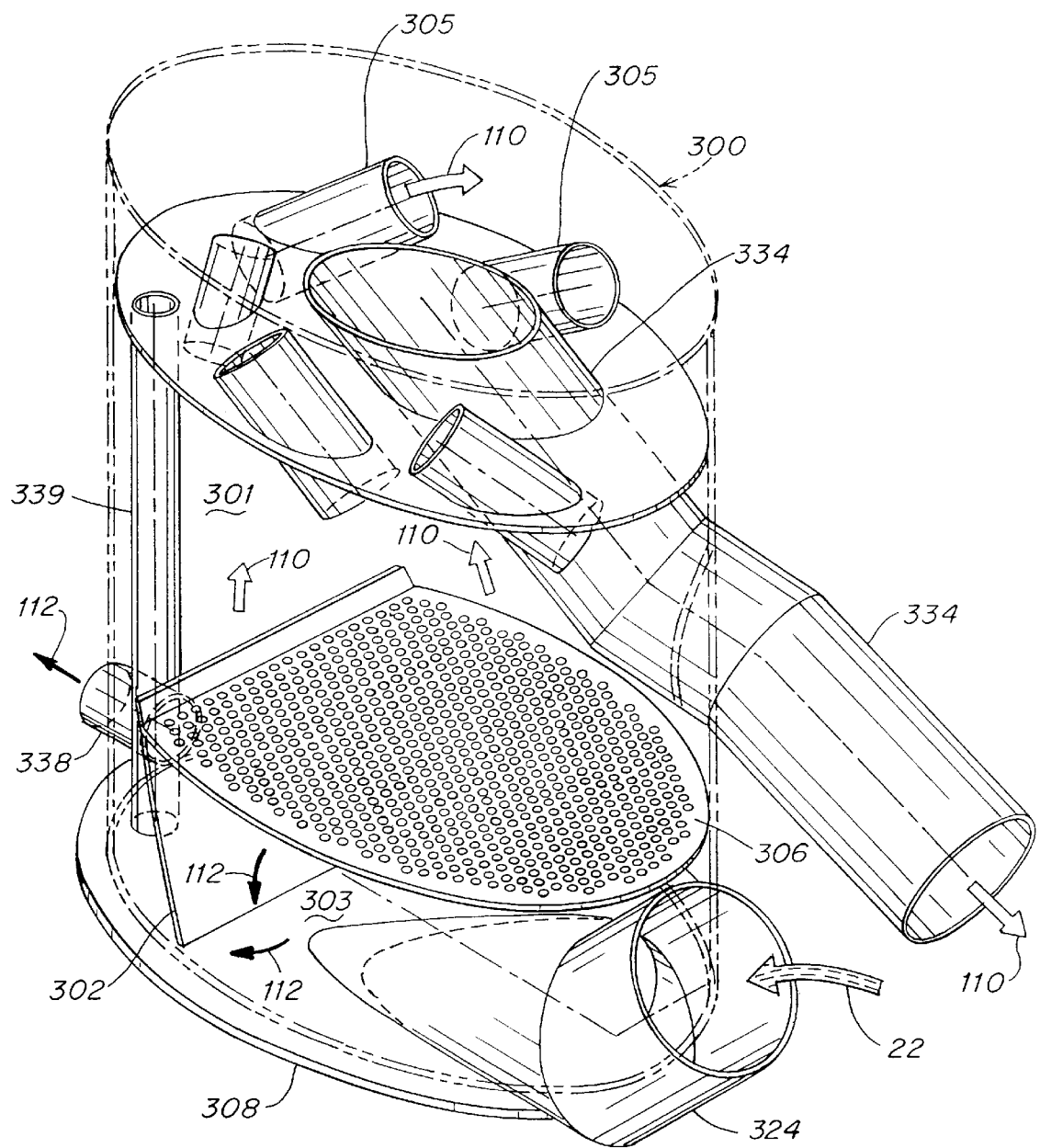
FIG. 14 is a cut-away isometric view of a known silencer using a passive separation plate.

In each of the preceding variations of separation plate 106 with vanes and apertures, mesh pad, or both, separation plate 106 will thus be understood to separate dry gas 110 from liquid coolant 112 by inertial or frictional effects, or both (hereafter, "dynamic separation" effects). Thus, all such variations of separation plate 106, and equivalents thereto, may be referred to herein as constituting a "dynamic separation" member and will be understood to include, or consist in part or entirely of, a "dynamic separator" element such as a vane and aperture, or mesh pad, that imposes a dynamic separation effect. To be contrasted are prior art designs that may simply provide a perforated baffle or similar element near the free-surface level of the fluid mixture to enhance gravitational, or "passive-restraining," separation effects. For example, the prior art design of FIG. 14 shows a perforated baffle 306 situated between a lower bubble chamber 303 and an upper dry gas chamber 301. Perforated baffle 306 may be referred to as a "passive-restraining separation" member because it relies primarily on gravity to separate dry gas 110 from liquid coolant 112. Specifically, perforated baffle 306 acts as a blanket to reduce vertical splashing and spray of fluid mixture 22; i.e., from lower bubble chamber 303 to upper dry gas chamber 301. Perforated baffle 306 thus acts simply to enhance gravitational separation of the heavier liquid coolant 112 from the lighter dry gas 110. Although some of liquid coolant 112 or fluid mixture 22, as well as dry gas 110, may pass upward through perforated baffle 306, the separation effect above perforated baffle 306 is similar to what would have been the case if there had been no baffle; i.e., the heavier liquid component tends toward the lower chamber and the gas component tends toward the upper chamber. Thus, the vertical alignment of the lower and upper chambers of such prior art devices is an integral component. Also shown in FIG. 14, although not pertinent to the present description of the prior art device's passive-restraining separation, are housing 300, attachment flange 308, resonator tubes 305, dry gas exhaust tube 334, liquid coolant discharge tube 338, secondary liquid coolant discharge tube 339, fluid-mixture inlet tube 324, and baffle 302.

In contrast to the prior art device of FIG. 14, the present invention may assume either a generally horizontal configuration as shown in FIGS. 1–13, or a generally vertical configuration (not shown) in which, for example, the expulsion chamber, with or without resonator tube, is located above the separation chamber for expulsion of dry gas and a lower expulsion tube is provided for expulsion of liquid coolant. Because of the design, size, and placement of marine engines and engine compartments, a generally horizontal silencer design, such as allowed by the present invention, may be advantageous.

Returning to the present invention as embodied in FIGS. 1–13, liquid coolant 112, having been separated from dry gas 110 by separation plate 106 in one of the variants of vanes and apertures, or mesh pad, or both, passes through liquid-coolant out-flow port 120 in downstream wall 122 of bottom portion 103 of separation chamber 100, and thence into dam chamber 130. As shown in FIG. 3, liquid coolant 112 then flows over the top of downstream dam wall 132 and into expulsion chamber 170.

Figure 8:
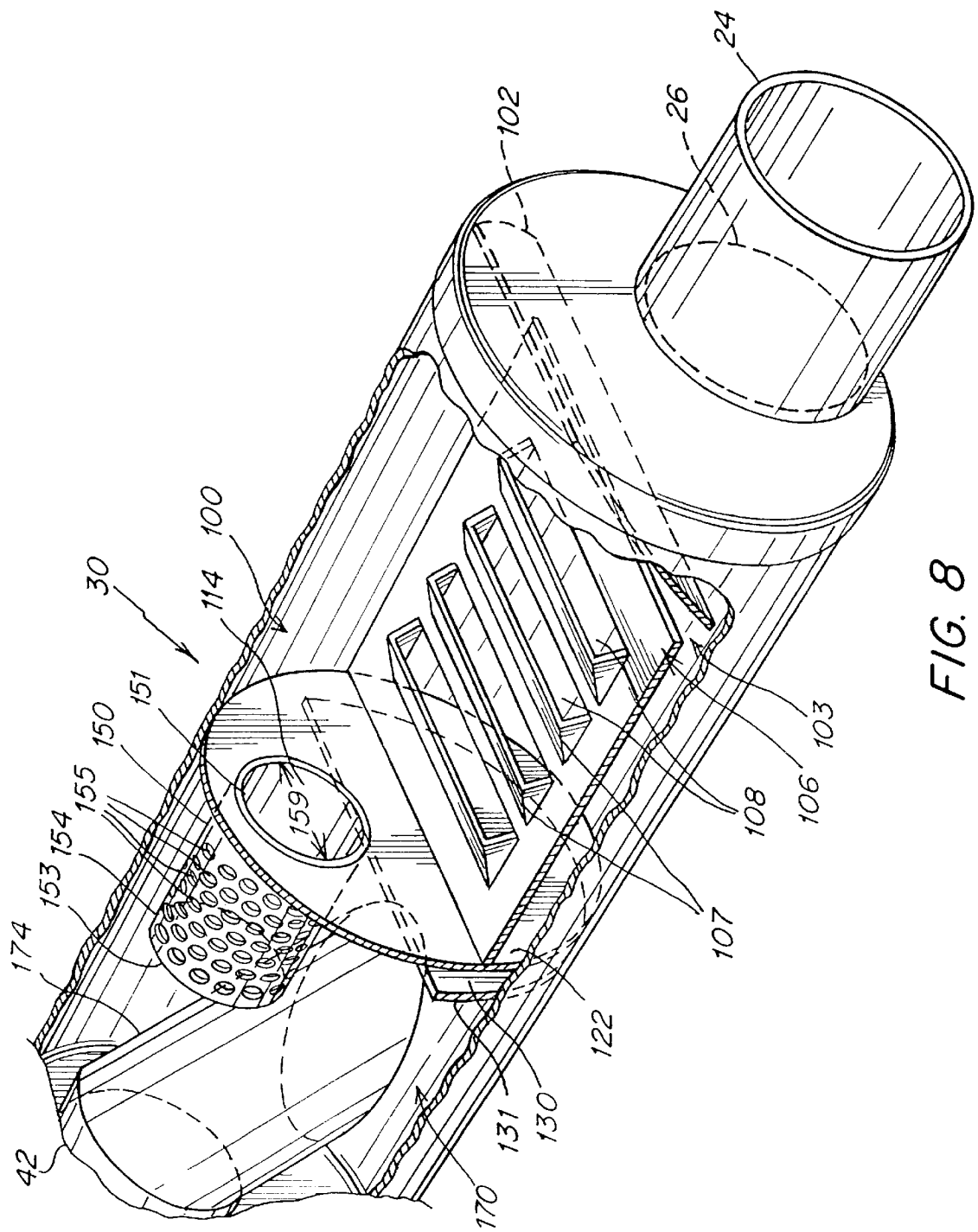
FIG. 8 is a partial cut-away, isometric view of the separation and expulsion chambers showing one embodiment of a resonator tube.

As also shown in FIG. 3, dry gas 110 enters resonator tube 150 through dry-gas out-flow port 114, which is directly connected to, and may be co-extensive with, dry-gas in-flow port 151 of resonator tube 150. Resonator tube 150 is also illustrated in FIG. 8, where it is shown that it may advantageously be a cylinder having a circular cross section of diameter 159. It will be understood that resonator tube 150 need not have such a shape, but could, for example, be a generally hollow body having as a cross section at any point along the longitudinal axis thereof any one, or a combination, of shapes of constant or varying size. As shown in FIGS. 4, 7 and 8 of this illustrative embodiment, dry-gas out-flow port 114 is a circular opening with a diameter equal to diameter 159 of resonator chamber 150 and to the diameter of dry-gas in-flow port 151. It will be understood, however, that the diameters of dry-gas in-flow port 151, resonator tube 150, and dry-gas out-flow port 114 may be different, and either or both ports may be shapes other than circular. Acoustic energy is partially excluded from dry gas 110 as it passes through resonator tube 150 in accordance with wave effects well known to those skilled in designing silencers employing such devices. Resonator tube 150 may also include perforations 155, as shown in FIG. 8, the effects and advantages of which are also well known to those skilled in such art.

Diameter 159 of resonator tube 150 may be made relatively small in this cold, wet/dry design as compared to the diameter that would be required in a cold, wet design of comparable silencing capability because of the smaller back pressure created by dry gas as compared to wet gas. The relatively smaller diameter 159 is directly related to the effectiveness of resonator tube 150 in reducing the amount of acoustic energy transported through it. Length 152 of resonator tube 150, as shown in FIG. 3, is determined based on a number of factors including the anticipated range and nominal values of engine speed and dry gas velocity, the tolerance levels for back pressure, the number and placement of perforations 155 in resonator tube 150, and the amount of quieting desired. As is also well known to those skilled in the art, the length of resonator tube 150 may be varied to "tune" the tube with respect to the frequencies of acoustic energy expected to be present in the dry gas as determined by such factors as engine size and speed.

As shown in FIG. 3, dry gas 110 exits through dry-gas out-flow port 153 in the downstream end 154 of resonator tube 150 and passes into thee expulsion chamber 170. It will be understood that, in other embodiments, there may be more than one resonator tube employed. It will further be understood that such tube or tubes may be arranged to spin dry gas 110 so that centrifugal separation effects are achieved.

Figure 9:
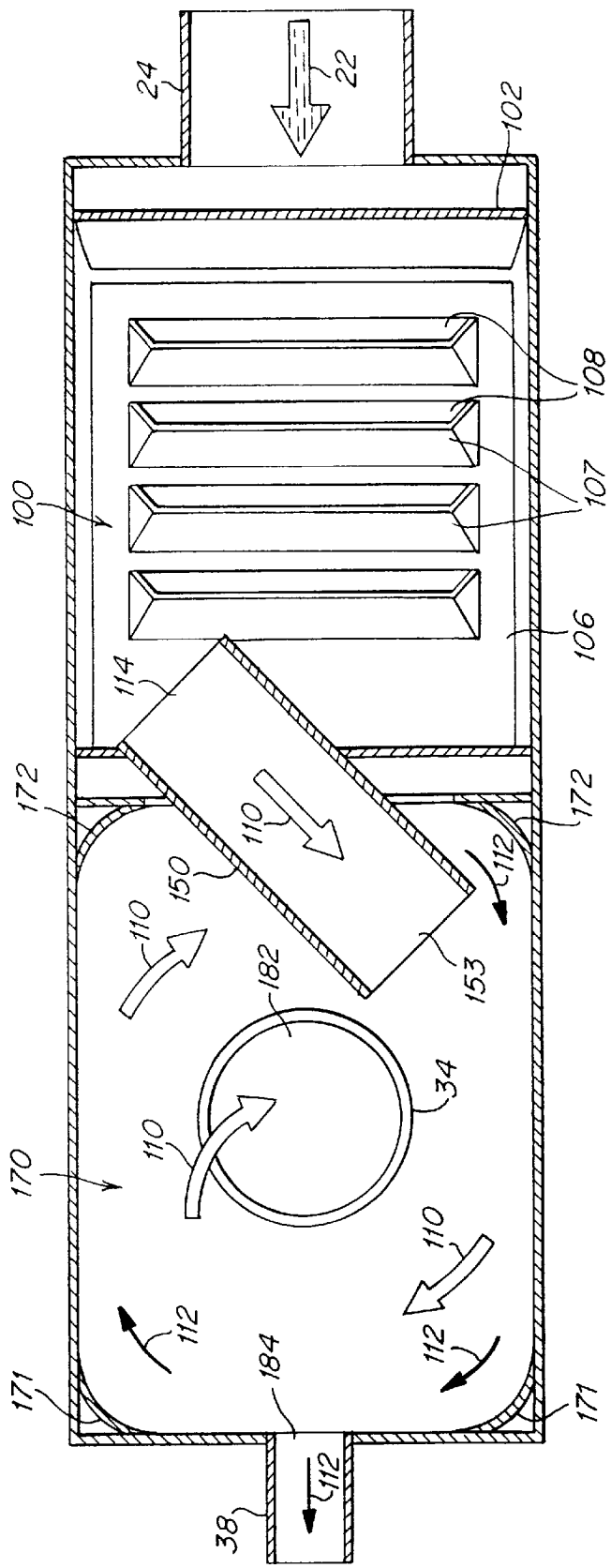
FIG. 9 is a top cross-sectional view of a resonator tube and dry gas exhaust tube in a centrifugal configuration.
Figure 10:
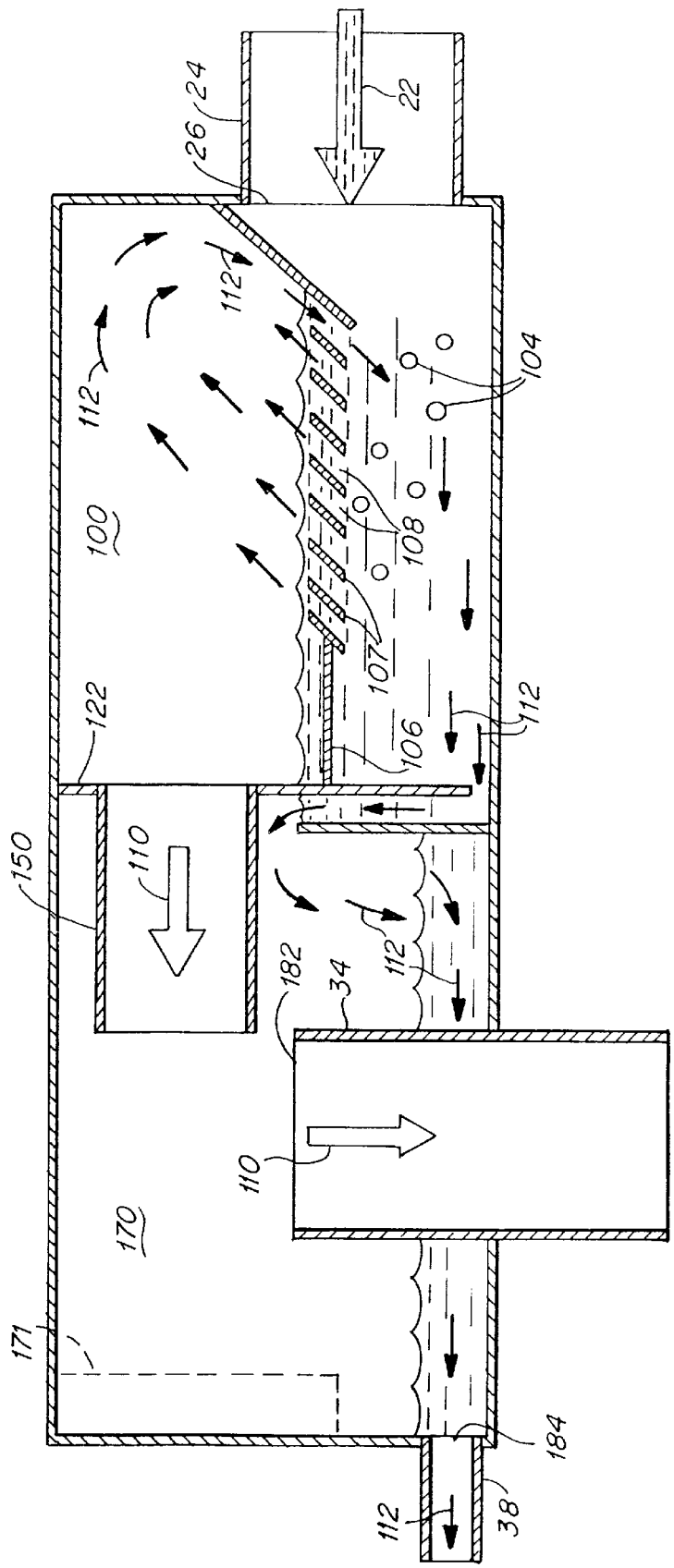
FIG. 10 is a cross-sectional side view of the resonator tube and dry gas exhaust tube of FIG. 9.
Figure 11:
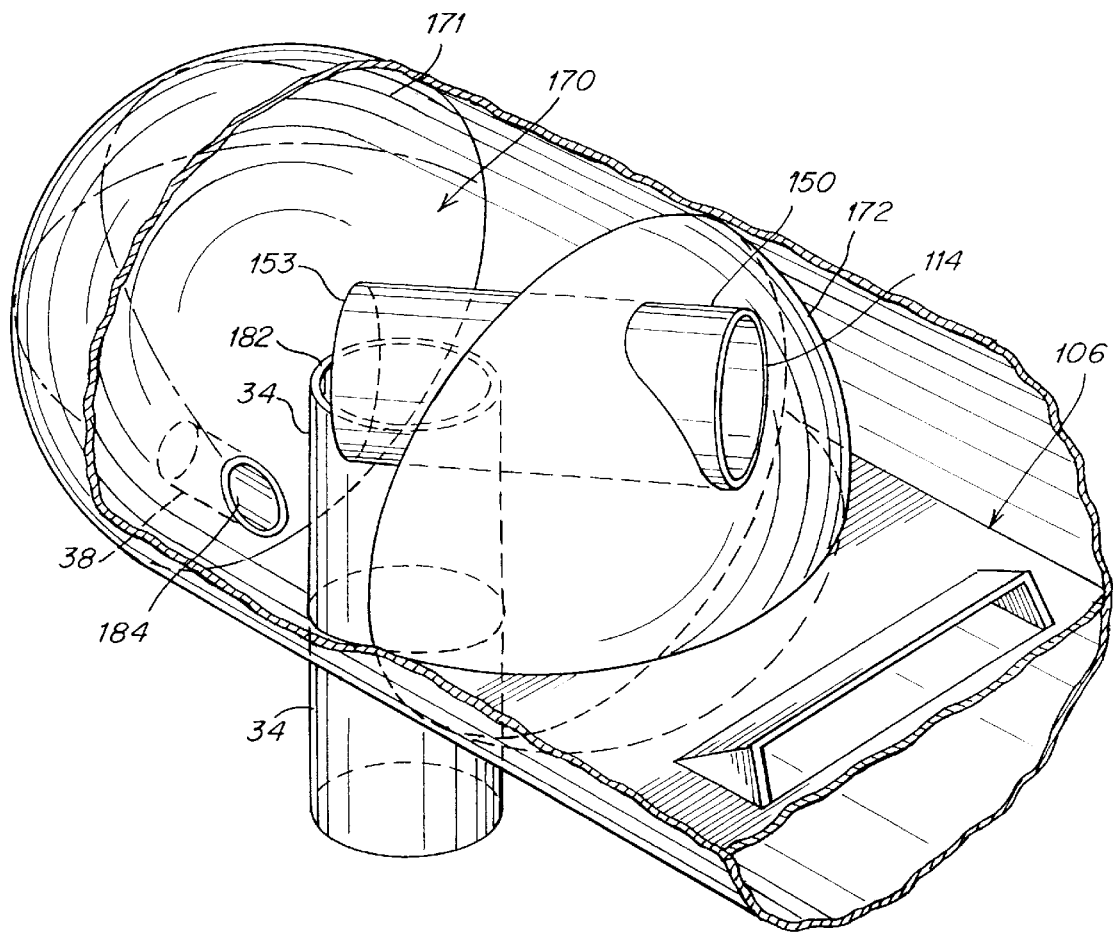
FIG. 11 is an isometric view of the resonator tube and dry gas exhaust tube of FIGS. 9 and 10.
Figure 12:
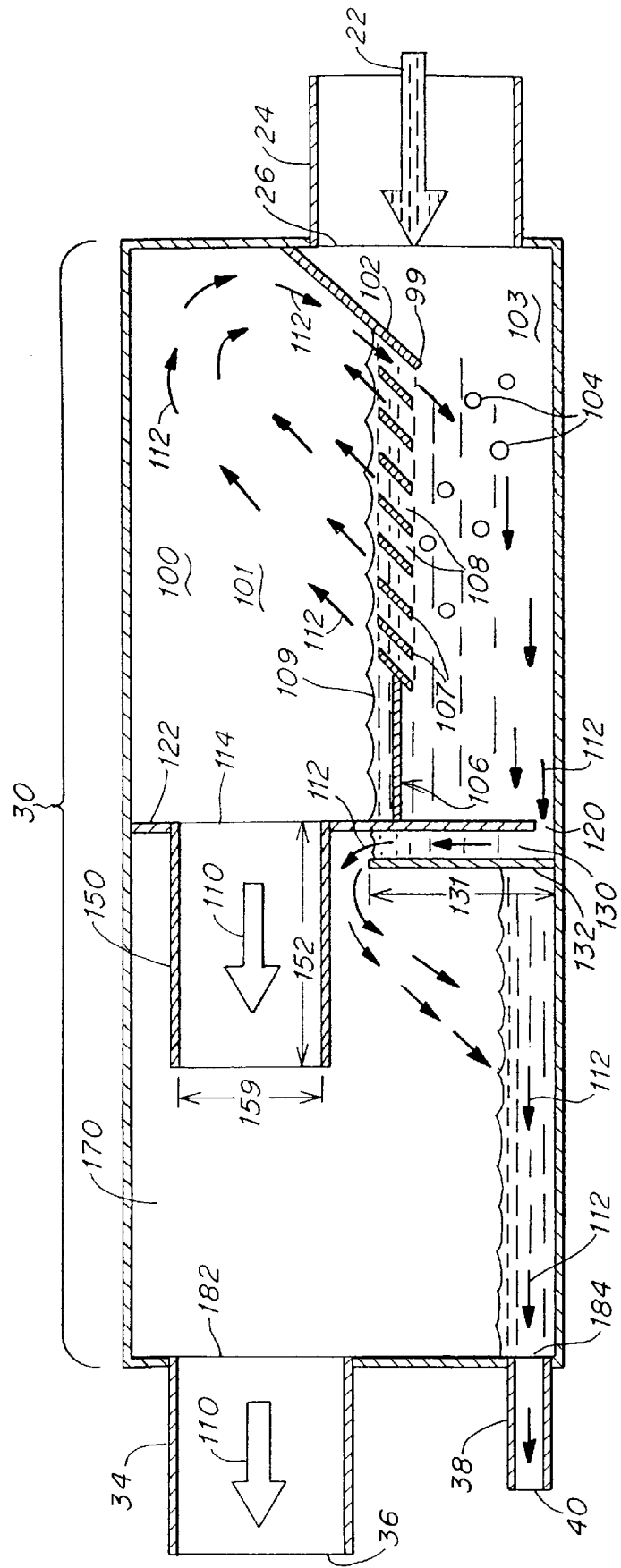
FIG. 12 is a cross-sectional side view of one embodiment of the invention for wet-dry-dry applications operating at relatively low engine speeds.

An exemplary design of a single resonator tube in such a centrifugal arrangement is shown in FIGS. 9–11 for a wet-dry-dry configuration such as shown in FIG. 1. As shown in FIGS. 9–11, resonator tube 150 is disposed at an angle with respect to the longitudinal axis of the silencer so as to impart an angular momentum to dry gas 110 as it circulates within expulsion chamber 170. To maintain the resulting swirling motion within expulsion chamber 170, a deflection baffle such as hemispherical bell 171 may be positioned at the downstream end of the chamber and a similar baffle such as hemispherical bell 172 may be positioned at the upstream end. It will be understood that such baffles may assume any shape that will smooth the flow of dry gas 110 around the corners of expulsion chamber 170, or such baffles may be omitted. Also, expulsion chamber 170 may itself consist of a sphere or be of generally spherical shape, or another shape conducive to maintaining a swirling motion of dry gas 110 within it. As shown in FIGS. 10 and 11, dry-gas expulsion port 182 is situated within expulsion chamber 170 at a height in such chamber that may advantageously, but need not be, somewhat below the height at which dry gas 110 is introduced into such chamber through resonator tube 150. As previously noted, dry gas 110 as it enters the expulsion chamber through the resonator tube contains residual amounts of liquid coolant 112 because complete separation in separation chamber 100 is not practicable. As indicated in FIG. 9, the angular momentum imparted to dry gas 110 by the orientation of resonator tube 150 causes residual liquid coolant 112, having greater inertia than the exhaust gas component of dry gas 110, to spin to the surfaces of expulsion chamber 170, or to bells 171 or 172, where liquid coolant 112 will tend to collect, condense, and fall by force of gravity toward the bottom of expulsion chamber 170. This residual liquid coolant 112 then exits expulsion chamber 170 near the bottom thereof through liquid-coolant expulsion port 184 and thence through coolant discharge tube 38. Similarly, any particulate matter retained within dry gas 110, also having a greater inertia than the dry gas, will tend to spin outward and then fall to the bottom of expulsion chamber 170. Dry gas 110, having a smaller inertia than residual liquid coolant 112, will tend toward the inner region of expulsion chamber 170 where it will exit through dry-gas expulsion port 182 and thence through exhaust tube 34, as shown in FIGS. 1, 9, and 10.

As has been noted with respect to FIGS. 1 and 2, dry gas 100 and liquid coolant 112 may exit expulsion chamber 170 either separately or together. In the embodiment illustrated in FIG. 3, liquid coolant 112 and dry gas 110 recombine near the bottom of expulsion chamber 170 and enter outlet tube 174. The recombined fluid mixture 22 may be ejected through outlet tube 174 by action of the "waterlift" principle that is well known to those skilled in the art of designing marine-exhaust silencers and gas-water separators. Outlet tube 174 may be joined to exhaust tube 42 near expulsion port 178 of expulsion chamber 170, so that fluid mixture 22 may be expelled to the external environment through exhaust tube 42 and exhaust port 44. A relief hole 180 may be provided in outlet tube 174 to control back pressure and also to regulate noise at low engine speeds.

FIG. 12 represents the alternative discharge from the expulsion chamber of dry gas 100 and liquid coolant 112 separately. All of the aspects of the embodiment of FIG. 3 are applicable to FIG. 12 until dry gas 110 and liquid coolant 112 enter expulsion chamber 170. Rather than being recombined and expelled through common outlet tube 174 as in FIG. 3, the dry gas in the embodiment represented by FIG. 12 is expelled through dry-gas expulsion port 182 of expulsion chamber 170 and thence through exhaust tube 34 and exhaust port 36 to the external environment. Similarly, liquid coolant 112 is separately expelled through liquid-coolant expulsion port 184 of expulsion chamber 170 and thence through coolant discharge tube 38 and coolant outlet port 40 to the external environment. As previously noted, the separate exhausting of dry gas 110 and expulsion of liquid coolant 112 allow for greater quieting as compared to the configuration of FIG. 3 because the noise due to the forceful expulsion of the coolant mixed with the gas is avoided. In addition, dry gas 110 may be discharged at a higher velocity than a combination of dry gas and liquid coolant without incurring the penalty of increased back pressure, as noted above. Also, higher velocity allows the use of a smaller pipe for a predetermined flow rate, and smaller pipes generally transmit less noise than larger pipes. Other advantages of providing a separate exhaust for the cooled, dry gas include the ability to route exhaust tube 34 in many directions in addition to that illustrated in FIG. 1, for example, to remote locations such as the top of a mast, or to the bow, as well as to the stern as shown in FIG. 1. In any such configuration, exhaust tube 34 may have a small diameter, travel and turn in any direction including up against gravity, and may have little or no thermal insulation. Employing longer routing for exhaust tube 34 may have the further benefit of allowing additional fallout of particulate matter from dry gas 110, thus resulting in cleaner effluent at more remote locations of exhaust port 36.

Whether in the wet-dry-wet configuration of FIG. 3 or the wet-dry-dry configuration of FIG. 12, it will be understood that many variations of the geometry of expulsion chamber 170 are possible. It will further be understood that it is also possible to have no expulsion chamber so that dry gas 110 exiting resonator tube 150, or exiting directly through dry-gas exhaust port 114 of separation chamber 100 if no resonator tube is employed, is combined with liquid coolant 112 exiting dam chamber 130 in outlet tube 174. Moreover, outlet tube 174 may also be omitted, so that the recombined fluid mixture 22 exits directly out exhaust tube 42 and thence to the external environment through exhaust port 44. Similarly, dry gas 110 and liquid coolant 112 may be expelled separately without an expulsion chamber. This result may be accomplished as to the dry gas by directly connecting dry-gas out-flow port 153 in the downstream end 154 of resonator tube 150 to exhaust tube 34, or, if there is no resonator tube, by directly connecting dry-gas exhaust port 114 of separation chamber 100 to exhaust tube 34. As to the separate expulsion of liquid coolant 112 without an expulsion chamber, liquid coolant 112 exiting dam chamber 130 may be directly connected to coolant discharge tube 38.

Figure 13:
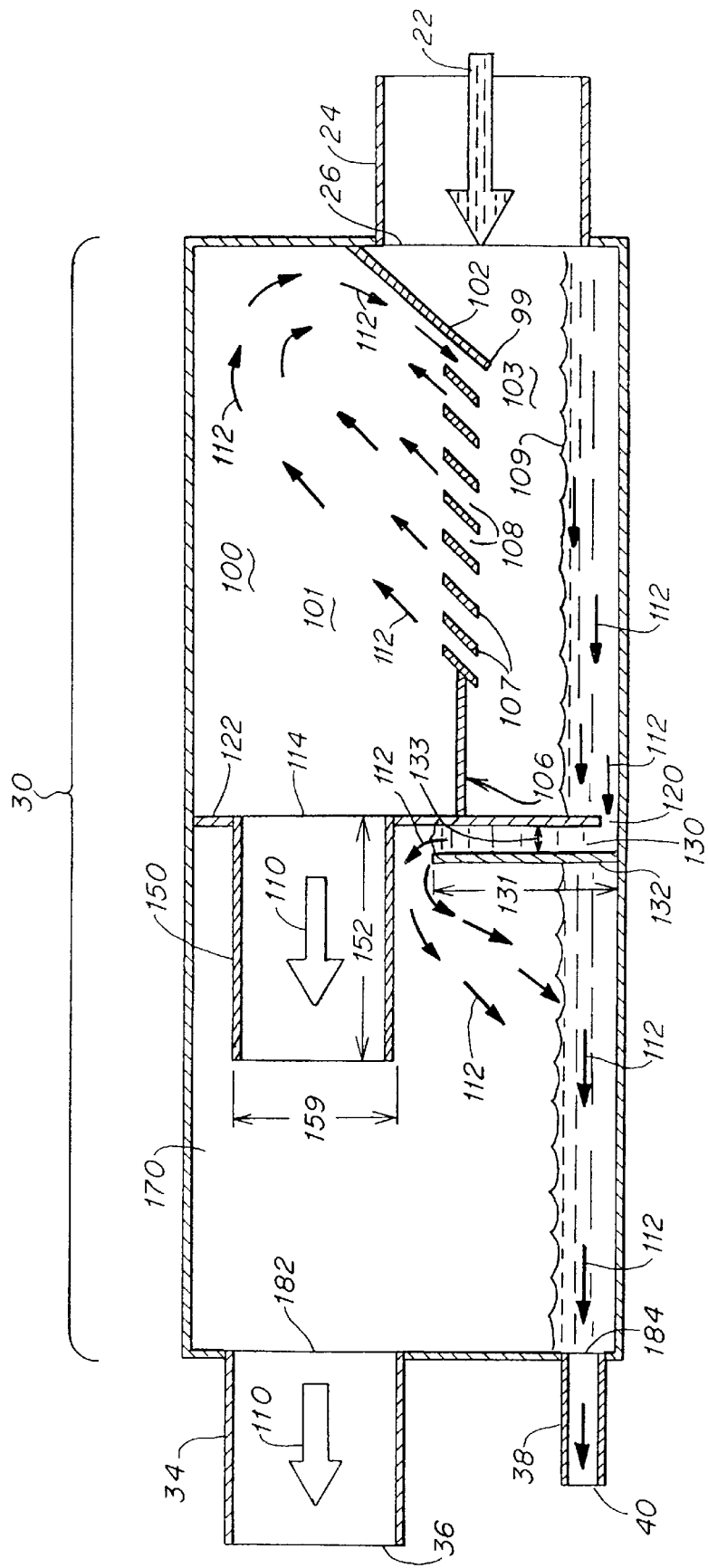
FIG. 13 is cross-sectional side view of one embodiment of the invention for wet-dry-dry applications operating at relatively high engine speeds.

As previously noted, engine speed typically will have an effect on the operation of the silencer. FIG. 13 represents the same wet-dry-dry configuration as that described above in relation to FIG. 12, except that the engine is assumed to be operating at a higher speed than in FIG. 12, such that the velocity of fluid mixture 22 into separation chamber 100 is roughly in the range of 30 to 110 fps. The consequence of such higher engine speed is that the rate of flow of dry gas 110 in upper portion 101 of separation chamber 100 increases, thus increasing the pressure in upper portion 101. This increased pressure forces free surface 109 of fluid mixture 22 down and away from separator plate 106, such drop in free surface 109 being accommodated by the flow of fluid mixture 22 through liquid-coolant out-flow port 120 and into dam chamber 130. The amount by which free surface 109 drops in response to such increased pressure may be regulated by the height 131 of dam wall 132 on the downstream end of dam chamber 130, by the width 133 of dam chamber 130, by the size of liquid coolant out-flow port 120, or by any combination thereof. Also, as noted above, the fluid dynamics in the portion of separation chamber 100 below separator plate 106 may change at higher engine speeds so that bubbles 104 in FIG. 12 are not as likely to form and thus are not shown in FIG. 13. The lack of bubbles and greater flow rate at the higher engine speeds generally reduces the amount of acoustic energy transferred from the exhaust gas to the liquid coolant component of fluid mixture 22 in lower portion 103 of separation chamber 100. Nonetheless, the cooling action of the liquid coolant component of fluid mixture 22 on the exhaust gas component during the retention of fluid mixture 22 in separation chamber 100 may typically result in a lowering of the acoustic velocity in the exhaust gas component by approximately 50 percent from its pre-cooling value.

Notwithstanding the lowering of free surface 109 below the separation plate 106 at the higher engine speeds depicted in FIG. 13, the more extreme agitation of fluid mixture 22 in separation chamber 100 at such speeds results in some of such mixture, for example as spray or bubbles above the free surface, flowing through separation plate 106 and thus undergoing inertial or frictional separation, or both, as described with respect to FIG. 3. Such separation may also occur with respect to liquid coolant 112, having once been separated from fluid mixture 22 by the inertial effects described above, again flowing through separation plate 106 resulting in further extraction of dry gas 110. Although the preceding description of the effects of engine speed pertained to the wet-dry-dry configuration of FIGS. 12 and 13, such effects are equally applicable to a wet-dry-wet configuration, such as shown in FIG. 3.

Having now described some embodiments of the invention, it should be apparent to those skilled in the art that the foregoing embodiments are illustrative only and not limiting, having been presented by way of example only. Numerous other embodiments and modifications thereof are contemplated as falling within the scope of the present invention as defined by the appended claims and equivalents thereto. By way of example and not limitation, the size, shape, and number of chambers may be changed so that, for instance, in one variation the separation chamber 100 is enlarged to allow greater inertial-frictional effects of separation and to allow a greater volume and surface area for the accumulation of the fluid mixture 22 entering the silencer through inlet 26. Also, additional chambers (not shown) may be added after separation chamber 100, such chambers being connected for transporting dry gas 110 or liquid coolant 112 through openings in their adjoining walls, or by a series of connectors, or both. Such additional chambers may be configured either in-line or otherwise, horizontally or otherwise, to provide additional opportunities for further extracting liquid coolant 112 and acoustic energy from dry gas 110. The height of the dam chamber, or placement of an out-flow port in a capped dam chamber, may be varied to achieve the desired silencing effect of passing the exhaust gas through the liquid coolant, or of achieving the desired inertial and/or frictional separation effects by positioning the free surface of the fluid mixture 22 to engage separation plate 106 at any specified engine speed. The size, shape, or placement of resonator tube 150 employed to extract acoustic energy from the dry gas may be varied; supplemental resonator tubes, with or without perforations, may be added; or centrifugal effects may be introduced by imparting to the dry gas angular momentum by the use of connectors, baffles, or other means either before or after the resonator tubes. Expulsion chamber 170 may be varied in size, shape, or placement; and various means for expelling the dry gas and liquid coolant, or the re-combined fluid mixture, may be employed.

What is claimed is:

1. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port; and at least one dynamic separation member being disposed within the separation chamber below and not above the dry gas out-flow port, and above the liquid-coolant out-flow port;

wherein the at least one dynamic separation member has an upper surface and a lower surface and has at least one passageway between the upper and lower surfaces, and wherein at least one vane is connected to the dynamic separation member adjacent the passageway, the at least one vane having a transverse surface facing upstream at an acute angle above the upper surface so that fluid mixture passing through the at least one passageway will be deflected upstream.

2. The silencer of claim 1, wherein the dynamic separation member in operation is generally horizontally disposed.

3. The silencer of claim 1, further comprising a baffle disposed within the separation chamber to deflect the fluid mixture below the dynamic separation member.

4. The silencer of claim 3, wherein the baffle is adjacent to the in-flow port and oriented at an obtuse angle to the flow of the fluid mixture into the separation chamber.

5. The silencer of claim 1, wherein the at least one vane extends below the lower surface.

6. The silencer of claim 1, further comprising a dam chamber having a dam liquid-coolant in-flow port fluidly connected to the liquid-coolant out-flow port of the separation chamber, and a dam liquid-coolant out-flow port.

7. The silencer of claim 6, wherein the dam liquid-coolant out-flow port is disposed at a position that substantially maintains the level of the fluid mixture in the separation chamber in proximity to the dynamic separation member at one operating speed of the marine engine.

8. The silencer of claim 6, wherein the size of the dam liquid-coolant in-flow port is selected so as to substantially maintain the level of the fluid mixture in the separation chamber in proximity to the dynamic separation member at one operating speed of the marine engine.

9. The silencer of claim 2, wherein the silencer in operation is generally horizontally disposed.

10. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member being disposed within the separation chamber below and not above the dry gas out-flow port, and above the liquid-coolant out-flow port; and at least one resonator chamber having a resonator dry-gas in-flow port gaseously connected to the dry-gas out-flow port of the separation chamber, and a resonator dry-gas expulsion port for expelling the dry gas.

11. The silencer of claim 10, wherein the at least one resonator chamber has at least one wall having at least one opening, the opening being in addition to the resonator dry-gas in-flow and out-flow ports.

12. The silencer of claim 10, wherein the at least one resonator chamber is tubular.

13. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member being disposed within the separation chamber below and not above the dry gas out-flow port, and above the liquid-coolant out-flow port;

a dam chamber having a dam liquid-coolant in-flow port fluidly connected to the liquid-coolant out-flow port of the separation chamber, and a dam liquid-coolant out-flow port; and an expulsion chamber having a dry-gas in-flow port gaseously connected to the dry-gas out-flow port of the separation chamber, a liquid-coolant in-flow port fluidly connected to the liquid-coolant out-flow port of the dam chamber, and an expulsion port through which the dry gas and liquid coolant are expelled.

14. The silencer of claim 13, wherein an outlet tube disposed within the expulsion chamber receives the dry gas and the liquid coolant and wherein the dry gas and liquid coolant are expelled via the outlet tube through the expulsion port.

15. The silencer of claim 14, wherein the outlet tube has at least one relief hole.

16. The silencer of claim 13, wherein the gaseous connection between the dry-gas in-flow port of the expulsion chamber and the dry-gas out-flow port of the separation chamber comprises at least one resonator chamber having a dry-gas in-flow port gaseously connected to the dry-gas out-flow port of the separation chamber and a dry-gas out-flow port gaseously connected to the dry-gas in-flow port of the expulsion chamber.

17. The silencer of claim 16, wherein the at least one resonator chamber is oriented at an angle transverse to the flow of dry gas into the resonator chamber dry-gas in-flow port to impart an angular momentum to the dry gas as it exits the resonator chamber dry-gas out-flow port.

18. The silencer of claim 17 further comprising at least one baffle disposed within and fixedly connected to the expulsion chamber to reduce loss of angular momentum of the dry gas as it swirls within the expulsion chamber.

19. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member being disposed within the separation chamber below and not above the dry gas out-flow port, and above the liquid-coolant out-flow port;

a dam chamber having a dam liquid-coolant in-flow port fluidly connected to the liquid-coolant out-flow port of the separation chamber, and a dam liquid-coolant out-flow port; and an expulsion chamber having a dry-gas in-flow port gaseously connected to the dry-gas out-flow port of the separation chamber, a liquid-coolant in-flow port fluidly connected to the liquid-coolant out-flow port of the dam chamber, a dry gas expulsion port gaseously connected to the dry-gas in-flow port of the expulsion chamber, and a liquid-coolant expulsion port fluidly connected to the liquid-coolant in-flow port of the expulsion chamber.

20. The silencer of claim 19, wherein the gaseous connection between the dry-gas in-flow port of the expulsion chamber and the dry-gas out-flow port of the separation chamber comprises at least one resonator chamber.

21. The silencer of claim 20, wherein the at least one resonator chamber is oriented at an angle transverse to the flow of dry gas into the resonator chamber dry-gas in-flow port to impart an angular momentum to the dry gas as it exits the resonator chamber dry-gas out-flow port.

22. The silencer of claim 21 further comprising at least one baffle disposed within and fixedly connected to the expulsion chamber to reduce loss of angular momentum of the dry gas as it swirls within the expulsion chamber.

23. A marine engine silencer, comprising:

means for receiving a fluid mixture;

separation means cooperating with the receiving means for dynamically separating the fluid mixture into dry gas and liquid coolant; and means for introducing the fluid mixture below and not substantially above the separation means as the fluid mixture enters the receiving means;

wherein the separation means has an upper surface and a lower surface and has at least one passageway between the upper and lower surfaces, and wherein at least one vane is connected to the dynamic separation member adjacent the passageway, the at least one vane having a transverse surface facing upstream at an acute angle above the upper surface so that fluid mixture passing through the at least one passageway will be deflected upstream.

24. The silencer of claim 23, further comprising means for regulating the level of the fluid mixture in the receiving means.

25. The silencer of claim 23, further comprising means for imparting an angular momentum to the dry gas after separation by the separation means.

26. A marine engine silencer, comprising:

means for receiving a fluid mixture;

separation means cooperating with the receiving means for dynamically separating the fluid mixture into dry gas and liquid coolant;

means for introducing the fluid mixture below and not substantially above the separation means as the fluid mixture enters the receiving means: and resonating means for reducing the acoustic energy of the dry gas after separation by the separation means.

27. A marine engine silencer, comprising:

means for receiving a fluid mixture;

separation means cooperating with the receiving means for dynamically separating the fluid mixture into dry gas and liquid coolant;

means for introducing the fluid mixture below and not substantially above the separation means as the fluid mixture enters the receiving means;

means for imparting an angular momentum to the dry gas after separation by the separation means; and deflecting means for maintaining the angular momentum of the dry gas.

28. A marine engine silencer, comprising:

means for receiving a fluid mixture;

separation means cooperating with the receiving means for dynamically separating the fluid mixture into dry gas and liquid coolant;

means for introducing the fluid mixture below and not substantially above the separation means as the fluid mixture enters the receiving means; and means for centrifugally drying the dry gas.

29. A method for silencing marine engines, comprising the steps of:

receiving a fluid mixture in a separation chamber, the mixture thereby attaining a free surface level in the separation chamber;

imposing at least one dynamic separation member in the separation chamber to separate the fluid mixture into dry gas and liquid coolant; and introducing the fluid mixture below the free surface level and the dynamic separation member as the fluid mixture enters the separation chamber;

wherein the at least one dynamic separation member has an upper surface and a lower surface and has at least one passageway between the upper and lower surfaces, and wherein at least one vane is connected to the dynamic separation member adjacent the passageway the at least one vane having a transverse surface facing upstream at an acute angle above the upper surface so that fluid mixture passing through the at least one passageway will be deflected upstream.

30. The method of claim 29, further comprising the step of regulating the free surface level of the fluid mixture.

31. The method of claim 29, further comprising the step of accumulating the fluid mixture in the separation chamber.

32. A method for silencing marine engines, comprising the steps of:

receiving a fluid mixture in a separation chamber, the mixture thereby attaining a free surface level in the separation chamber;

imposing at least one dynamic separation member in the separation chamber to separate the fluid mixture into dry gas and liquid coolant;

introducing the fluid mixture below the free surface level and the dynamic separation member as the fluid mixture enters the separation chamber; and introducing the dry gas into a resonator chamber.

33. The method of claim 32 further comprising the step of orienting the resonator chamber to impart an angular momentum to the dry gas.

34. A method for silencing marine engines, comprising the steps of:

receiving a fluid mixture in a separation chamber, the mixture thereby attaining a free surface level in the separation chamber;

imposing at least one dynamic separation member in the separation chamber to separate the fluid mixture into dry gas and liquid coolant;

introducing the fluid mixture below the free surface level and the dynamic separation member as the fluid mixture enters the separation chamber; and separately exhausting the dry gas and the liquid coolant.

35. A method for silencing marine engines, comprising the steps of:

receiving a fluid mixture in a separation chamber, the mixture thereby attaining a free surface level in the separation chamber;

imposing at least one dynamic separation member in the separation chamber to separate the fluid mixture into dry gas and liquid coolant;

introducing the fluid mixture below the free surface level and the dynamic separation member as the fluid mixture enters the separation chamber; and recombining and jointly exhausting the dry gas and the liquid coolant.

36. A method for silencing marine engines by reducing the acoustic energy of marine engine exhaust gas, comprising the steps of:

mixing the exhaust gas with a liquid coolant;

receiving the mixture in a separation chamber, the mixture thereby attaining a free surface level in the separation chamber;

imposing at least one dynamic separation member roughly adjacent the free surface level; and introducing the mixture below the free surface level and the dynamic separation member as the mixture enters the separation chamber;

wherein the at least one dynamic separation member has an upper surface and a lower surface and has at least one passageway between the upper and lower surfaces, and wherein at least one vane is connected to the dynamic separation member adjacent the passageway, the at least one vane having a transverse surface facing upstream at an acute angle above the upper surface so that fluid mixture passing through the at least one passageway will be deflected upstream.

37. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member disposed within the separation chamber and having upper and lower surfaces;

wherein the dynamic separation member is disposed within the separation chamber effectively above the in-flow port, below the dry gas out-flow port, and above the liquid-coolant out-flow port; and wherein the at least one dynamic separation member has at least one passageway between the upper and lower surfaces and at least one vane is connected to the dynamic separation member adjacent the passageway, the at least one vane having a transverse surface facing upstream at an acute angle above the upper surface so that fluid mixture passing through the at least one passageway will be deflected upstream.

38. The silencer of claim 37, wherein the at least one vane extends below the lower surface.

39. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member disposed within the separation chamber and having upper and lower surfaces;

wherein the dynamic separation member is disposed within the separation chamber effectively above the in-flow port, below the dry gas out-flow port, and above the liquid-coolant out-flow port; and wherein the at least one dynamic separation member comprises at least one mesh pad.

40. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member disposed within the separation chamber and having upper and lower surfaces; and at least one resonator chamber having a resonator dry-gas in-flow port gaseously connected to the dry-gas out-flow port of the separation chamber, and a resonator dry-gas expulsion port for expelling the dry gas;

wherein the dynamic separation member is disposed within the separation chamber effectively above the in-flow port, below the dry gas out-flow port, and above the liquid-coolant out-flow port, and wherein the at least one resonator chamber has at least one wall having at least one opening, the opening being in addition to the resonator dry-gas in-flow and out-flow ports.

41. The silencer of claim 40, wherein the at least one resonator chamber is tubular.

42. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member disposed within the separation chamber and having upper and lower surfaces;

a dam chamber having a dam liquid-coolant in-flow port fluidly connected to the liquid-coolant out-flow port of the separation chamber, and a dam liquid-coolant out-flow port; and an expulsion chamber having a dry-gas in-flow port gaseously connected to the dry-gas out-flow port of the separation chamber, a liquid-coolant in-flow port fluidly connected to the liquid-coolant out-flow port of the dam chamber, and an expulsion port through which the dry gas and liquid coolant are expelled;

wherein the dynamic separation member is disposed within the separation chamber effectively above the in-flow port, below the dry gas out-flow port, and above the liquid-coolant out-flow port.

43. The silencer of claim 42, wherein an outlet tube disposed within the expulsion chamber receives the dry gas and the liquid coolant and wherein the dry gas and liquid coolant are expelled via the outlet tube through the expulsion port.

44. The silencer of claim 43, wherein the outlet tube has at least one relief hole.

45. The silencer of claim 42, wherein the gaseous connection between the dry-gas in-flow port of the expulsion chamber and the dry-gas out-flow port of the separation chamber comprises at least one resonator chamber having a dry-gas in-flow port gaseously connected to the dry-gas out-flow port of the separation chamber and a dry-gas out-flow port gaseously connected to the dry-gas in-flow port of the expulsion chamber.

46. The silencer of claim 45, wherein the at least one resonator chamber is oriented at an angle transverse to the flow of dry gas into the resonator chamber dry-gas in-flow port to impart an angular momentum to the dry gas as it exits the resonator chamber dry-gas out-flow port.

47. The silencer of claim 46 further comprising at least one baffle disposed within and fixedly connected to the expulsion chamber to reduce loss of angular momentum of the dry gas as it swirls within the expulsion chamber.

48. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port;

at least one dynamic separation member disposed within the separation chamber and having upper and lower surfaces;

a dam chamber having a dam liquid-coolant in-flow port fluidly connected to the liquid-coolant out-flow port of the separation chamber, and a dam liquid-coolant out-flow port; and an expulsion chamber having a dry-gas in-flow port gaseously connected to the dry-gas out-flow port of the separation chamber, a liquid-coolant in-flow port fluidly connected to the liquid-coolant out-flow port of the dam chamber, a dry gas expulsion port gaseously connected to the dry-gas in-flow port of the expulsion chamber, and a liquid-coolant expulsion port fluidly connected to the liquid-coolant in-flow port of the expulsion chamber;

wherein the dynamic separation member is disposed within the separation chamber effectively above the in-flow port, below the dry gas out-flow port, and above the liquid-coolant out-flow port.

49. The silencer of claim 48, wherein the gaseous connection between the dry-gas in-flow port of the expulsion chamber and the dry-gas out-flow port of the separation chamber comprises at least one resonator chamber.

50. The silencer of claim 49, wherein the at least one resonator chamber is oriented at an angle traverse to the flow of dry gas into the resonator dry-gas in-flow port to impart an angular momentum to the dry gas as it exits the resonator dry-gas out-flow port.

51. The silencer of claim 50 further comprising at least one baffle disposed within and fixedly connected to the expulsion chamber to reduce loss of angular momentum of the dry gas as it swirls within the expulsion chamber.

52. A marine engine silencer, comprising:

means for receiving a fluid mixture;

separation means cooperating with the receiving means for dynamically separating the fluid mixture into dry gas and liquid coolant;

means for imparting an angular momentum to the dry gas after separation by the separation means; and deflecting means for maintaining the angular momentum of the dry gas.

53. A method for silencing marine engines, comprising the steps of:

receiving a fluid mixture in a separation chamber, the mixture thereby attaining a free surface level in the separation chamber;

imposing a dynamic separation member in the separation chamber to separate the fluid mixture into dry gas and liquid coolant; and recombining and jointly exhausting the dry gas and the liquid coolant.

54. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port; and at least one dynamic separation member disposed within the separation chamber;

wherein the fluid mixture is received in the separation chamber below, and not substantially above, the dynamic separation member;

and further wherein the at least one dynamic separation member has upper and lower surfaces and has at least one passageway between the upper and lower surfaces, and wherein at least one vane is connected to the dynamic separation member adjacent the passageway, the at least one vane having a transverse surface facing upstream at an acute angle above the upper surface so that fluid mixture passing through the at least one passageway will be deflected upstream.

55. The silencer of claim 54, wherein the dynamic separation member is disposed within the separation chamber below and not above the dry gas out-flow port, and above the liquid-coolant out-flow port.

56. The silencer of claim 54, wherein the dynamic separation member in operation is generally horizontally disposed.

57. The silencer of claim 54, further comprising a baffle disposed within the separation chamber to deflect the fluid mixture below the dynamic separation member.

58. The silencer of claim 57, wherein the baffle is adjacent to the in-flow port and oriented at an obtuse angle to the flow of the fluid mixture into the separation chamber.

59. The silencer of claim 54, wherein the at least one vane extends below the lower surface.

60. The silencer of claim 54, further comprising a dam chamber having a dam liquid-coolant in-flow port fluidly connected to the liquid-coolant out-flow port of the separation chamber, and a dam liquid-coolant out-flow port.

61. The silencer of claim 60, wherein the dam liquid-coolant out-flow port is disposed at a position that substantially maintains the level of the fluid mixture in the separation chamber in proximity to the dynamic separation member at one operating speed of the marine engine.

62. The silencer of claim 60, wherein the size of the dam liquid-coolant in-flow port is selected so as to substantially maintain the level of the fluid mixture in the separation chamber in proximity to the dynamic separation member at one operating speed of the marine engine.

63. A marine engine silencer for reducing the acoustic energy of a fluid mixture of marine engine exhaust gas and a liquid coolant, comprising:

a separation chamber having an in-flow port for receiving the fluid mixture, a dry gas out-flow port and a liquid-coolant out-flow port;

at least one dynamic separation member disposed within the separation chamber; and at least one resonator chamber having a resonator dry-gas in-flow port gaseously connected to the dry-gas out-flow port of the separation chamber, and a resonator dry-gas expulsion port for expelling the dry gas wherein the fluid mixture is received in the separation chamber below, and not substantially above the dynamic separation member.

64. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port; and at least one dynamic separation member being disposed within the separation chamber below and not above the dry gas out-flow port, and above the liquid-coolant out-flow port;

wherein the at least one dynamic separation member comprises at least one mesh pad.

65. A marine engine silencer for reducing the acoustic energy of a fluid mixture of marine engine exhaust gas and a liquid coolant, comprising:

a separation chamber having an in-flow port for receiving the fluid mixture, a dry gas out-flow port, and a liquid-coolant out-flow port; and at least one dynamic separation member disposed within the separation chamber;

wherein the fluid mixture is received in the separation chamber below, and not substantially above, the dynamic separation member;

wherein the at least one dynamic separation member comprises at least one mesh pad.

* * * * *